(No Model.)  2 Sheets—Sheet 1.

J. W. CLOUD.
RAIL JOINT.

No. 592,865. Patented Nov. 2, 1897.

Witnesses. Inventor.
Harry Drury John W Cloud
 by
 Francis T. Chambers
 Attorney.

THE NORRIS PETERS CO., PHOTO-LITHO., WASHINGTON, D. C.

(No Model.)  2 Sheets—Sheet 2.
J. W. CLOUD.
RAIL JOINT.
No. 592,865. Patented Nov. 2, 1897.
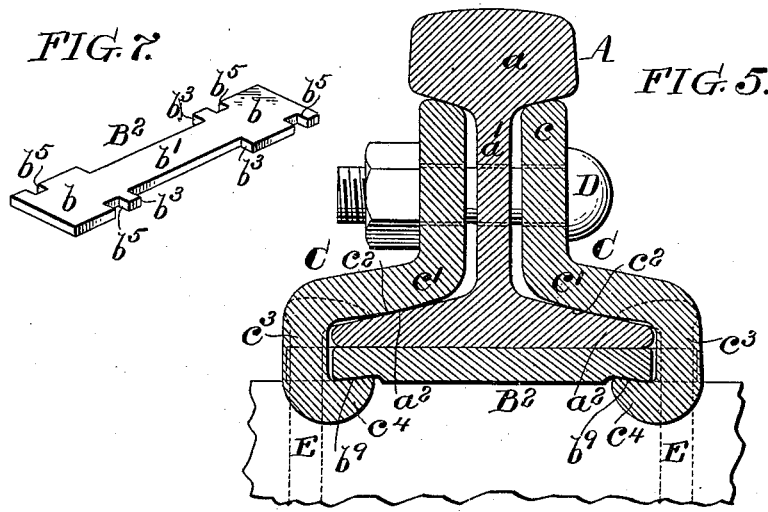
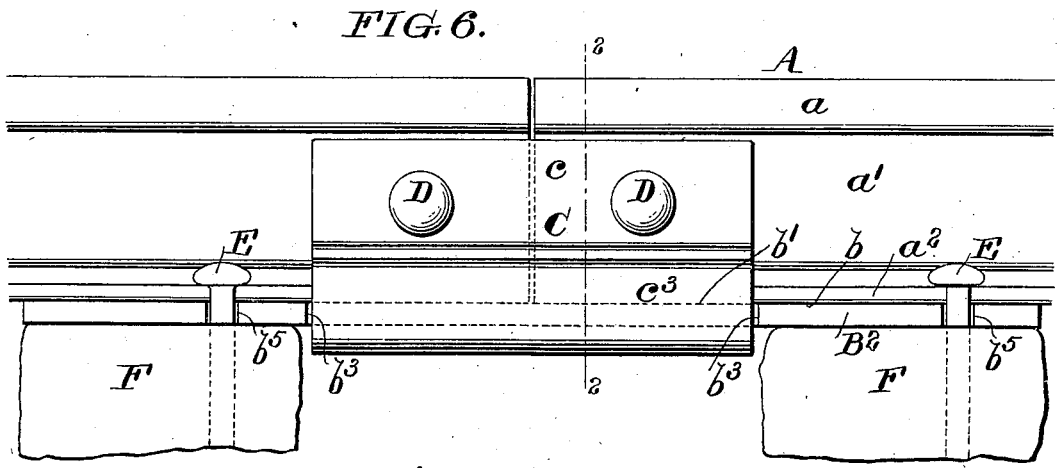
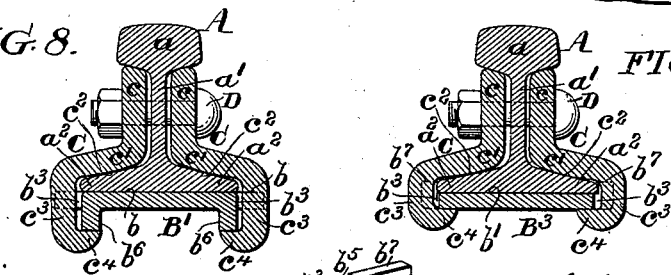 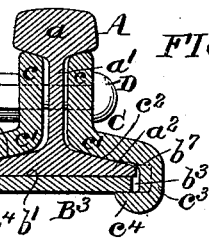
Witnesses. 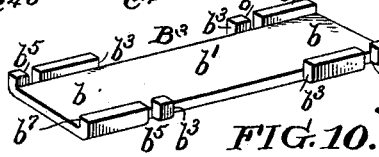
Inventor.
John W. Cloud
by Francis T. Chambers
his Attorney.

UNITED STATES PATENT OFFICE.

JOHN WILLS CLOUD, OF CHICAGO, ILLINOIS.

RAIL-JOINT.

SPECIFICATION forming part of Letters Patent No. 592,865, dated November 2, 1897.

Application filed January 27, 1896. Serial No. 576,907. (No model.)

*To all whom it may concern:*

Be it known that I, JOHN WILLS CLOUD, a citizen of the United States, residing in the city of Chicago, in the county of Cook and State of Illinois, have invented a new and useful Improvement in Rail-Joints, of which the following is a true and exact description, reference being had to the accompanying drawings, which form a part of the specification.

My invention relates to rail-joints, and has for its object to provide a joint of simple and cheap construction and which is adapted to preserve both the line and surface of the rails, and also to prevent creeping.

The nature of my improvements will be best understood as described in connection with the drawings in which they are illustrated, and in which—

Figure 1:
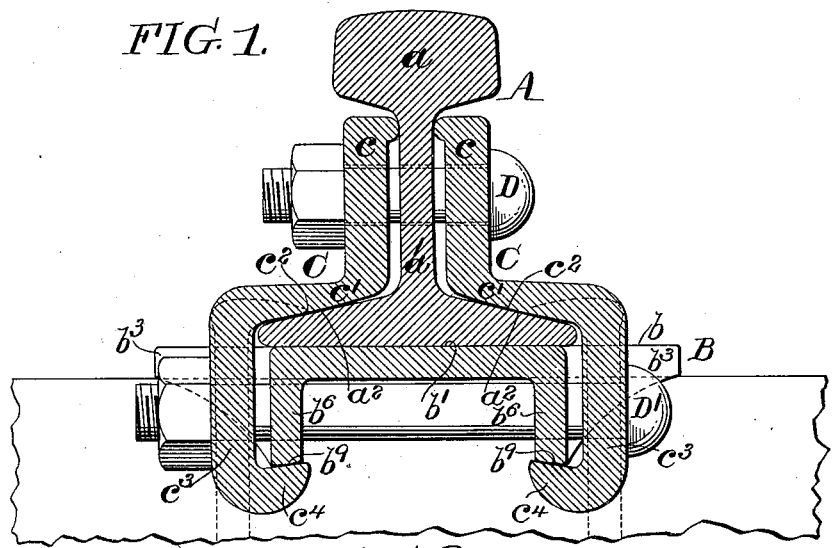
Figure 2:
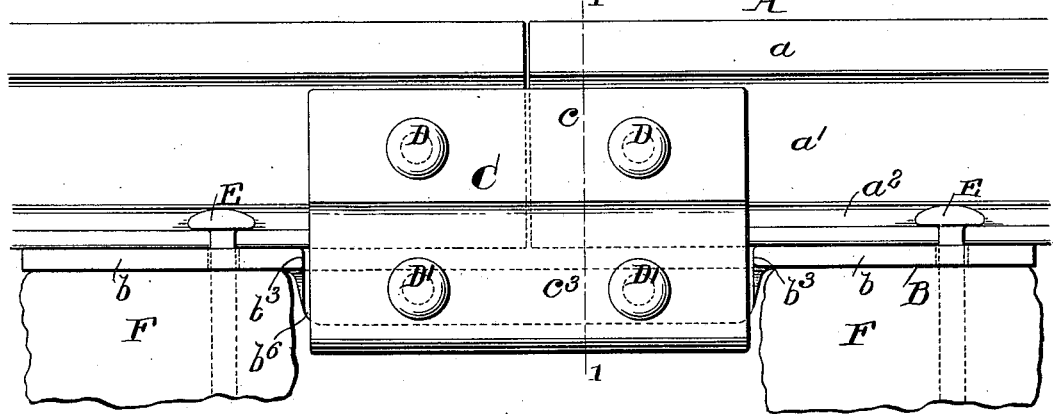
Figure 3:
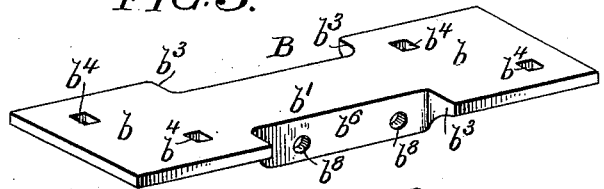
Figure 4:
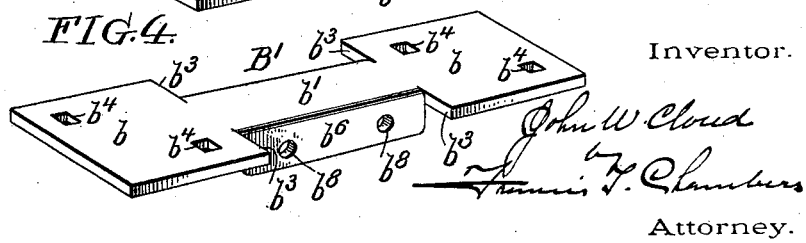

Figure 1 is a transverse section through my rail-joint, constructed for the greatest strength, the section being taken on the line 1 1 of Fig. 2. Fig. 2 is a side view of the same joint; Fig. 3, a perspective view of the base-plate shown in Figs. 1 and 2; Fig. 4, a perspective view of a slightly-modified form of base-plate. Fig. 5 is a transverse section taken on the line 2 2 of Fig. 6, showing a modified form of joint. Fig. 6 is a side elevation of the joint shown in Fig. 5. Fig. 7 is a perspective view of the base-plate shown in Figs. 5 and 6. Fig. 8 is a cross-section through a rail-joint embodying a base-plate such as is shown in Fig. 4. Fig. 9 is a cross-section through a rail-joint embodying still another modification in the form of a base-plate, and Fig. 10 is a perspective view of the base-plate shown in Fig. 9.

A indicates the rails, $a$ being the head, $a'$ the web of the rail, and $a^2$ $a^2$ the base-flanges of the rail.

B, B', B², and B³ indicate various modifications in the form of the base-plate, which is an essential element of my joint. As shown in Figs. 1, 2, and 3, the base-plate is marked B. It is made, as shown, of sufficient length to be supported on adjacent ties F F, lying on each side of the joint, and is secured to the ties by spikes or bolts E, which in the figures referred to pass through holes $b^4$ in the portions $b$ $b$ of the base-plate which rest upon the ties. The width of the base-plate is somewhat greater than that of the rail-base, so as to give room for spike-holes on each side of the rail, by which the base-plate is secured to the ties. The central portion $b'$ of the base-plate is made thinner or narrower than the under portions, preferably somewhat narrower than the rail-base, thus forming shoulders $b^3$ $b^3$ at each end of the narrow portion, and between which shoulders lie the joint-plates to be hereinafter described. Preferably I form the base-plate of a rectangular piece of metal, pushing down the sides in a die, as indicated at $b^6$ $b^6$, these downwardly-turned central flanges strengthening and stiffening the base-plate, and also being broad enough to permit of the formation of bolt-holes, as indicated at $b^8$, and to afford a better hold for the jaws of the joint-plates I bevel the ends of the flanges inwardly, as shown at $b^9$ $b^9$.

The base-plate indicated in Figs. 4 and 8 is substantially similar to that indicated in Figs. 1, 2, and 3, except that the metal is slit to form the shoulders $b^3$ before the flanges $b^6$ are turned down at right angles to the central portion $b'$, nor have I shown the bevels $b^9$ in this modification.

The base-plate shown in Figs. 5, 6, and 7 has the metal, which in the former figures is turned down to form the flange $b^6$, entirely cut away, and this base-plate also differs from the other forms already described in having in place of the spike-holes $b^4$ spike-notches $b^5$, this construction permitting the base-plate to be securely fastened to the ties and requiring less metal than the other forms. In this form of base-plate I form the bevels $b^9$ in rolling the plates and they extend as parallel grooves throughout its length.

The base-plate shown in Figs. 8 and 10 is substantially similar to that shown in Figs. 5, 6, and 7, except that it is made from a plate rolled with projecting sides or flanges, as indicated at $b^7$, the rail-base lying between these flanges, as indicated in Fig. 9, and I here omit bevels $b^9$, though they could be used if desired.

C C indicate the joint-plates. These joint-plates are made with an upper flange $c$, which is adapted to lie against or near the upper part of the rail, either the upper part of the web, as shown in Fig. 1, or the lower part of the head, as shown in Figs. 5, 8, and 9. Below the flanges $c$ are outwardly-extending flanges $c'$, adapted to lie upon the rail-base. From the outer ends of these flanges extend downward flanges $c^3$, from the lower ends of which extend the inward flanges or jaws $c^4$, which rest beneath and engage the under side of the base-plate entering the bevels $b^9$ when they are used. The parts are of course proportioned for the rail and base-plate with which they are used. When the base-plate is provided with a downwardly-inclined flange $b^6$, the flanges $c^4$ of the joint-plates rest beneath these flanges, while when no such flange is provided the flanges $c^4$ rest directly on the bottom of the base-plate. In all cases the breadth of the joint-plate should be such as to nearly fit between the shoulders $b^3$ of the base-plate.

It is an important feature of my invention that the joint-plates should each bear upon the under side of the base-plate and upon the top of the rail-base, and they may also bear against the upper part of the rail, and this object is secured when desired by so constructing the joint-plates that they can quite well adapt themselves to a sufficient extent to the form and position of the parts with which they are used. In doing this I avail myself to a certain extent of the elasticity of the metal, preferably forming the under side or contacting face of the flange $c'$ with a slight curve, as indicated at $c^2$. This curved contacting face permits the flange $c'$ to slide more freely on the base of the rail and at the same time should be made so slight as to practically straighten itself out under the stress to which it is subjected. I find it advisable also to make the portion of the flange $c'$ from which the flange $c$ springs somewhat thinner than the rest of the flange, so that the metal will bend more readily at this point, permitting the flange $c$ to be drawn inward or pressed outward when the flanges $c'$ and $c^4$ have been brought to a fixed and permanent clamping-contact with the base-plate and rail-base.

A very slight curvature at the place indicated at $c^2$ and a very slight thinning of the flange will be sufficient to insure the adjustability of the joint-plate, and in the drawings I have somewhat exaggerated both features for the purpose of making clear and plain the details of constructions to which I have referred.

D D indicate bolts passing through the flanges $c$ $c$ of the joint-plates and through the webs of the rails. By means of these bolts the parts are drawn tightly together and held in place. Where a base-plate with downwardly-extending flanges $b^6$ is used, it is advisable to use also bolts $D'$ $D'$, which pass through the flanges $c^3$, as well as the flanges $b^6$, securing the lower part of the joint-plates together as well as the upper parts.

It will be seen that by the construction described the surface of the rails is secured both by the strength of the base-plate and the strength of the joint-plate. It is obvious, of course, that as the base-plate is secured to the ties and the joint-plates are securely anchored between the shoulders $b^3$ of the base-plates, as well as bolted securely to the webs of the rails, that my joint will effectually prevent creeping.

The engagement of the jaws $c^4$ with the bevels $b^9$ obviously tends to hold them in place against any strains offered by the upper bolts, and in this way the function of the lower bolts is filled in the plates like Fig. 5 and supplemented where such bolts are used.

When it is not desired to have the joint-plates bear against the upper part of the rail, it is not necessary to form the rounded bearing thereon for the upper part of the rail-base nor to make the portion $C'$ of the flange thinner than the rest of the flange.

Having now described my invention, what I claim as new, and desire to secure by Letters Patent, is—

1. A rail-joint having in combination a base-plate adapted to lie beneath the abutted rail ends and to be supported and secured at each end on adjacent ties, said base-plate having a narrow central portion $b'$, shoulders $b^3$ and inwardly and upwardly extending bevels $b^9$, with joint-plates C C adapted to fit and engage between the shoulders $b^3$ of the base-plate, to engage beneath said base-plates in bevels $b^9$ and upon the rail-base and to receive the bolts which pass through the rail-web, and bolts D passing through the rail-web and the upper parts of the joint-plates.

2. A rail-joint having in combination a base-plate adapted to lie beneath the abutted rail ends and to be supported and secured at each end on adjacent ties, said base-plate having a narrow central portion $b'$, downwardly-turned flanges $b^6$ $b^6$ and shoulders $b^3$, with joint-plates C C adapted to fit between the shoulders $b^3$ of the base-plate and to engage beneath the flanges $b^6$ of said base-plates upon the rail-base and to receive the bolts which pass through the rail-web, bolts D passing through the rail-web and the upper parts of the joint-plates and bolts $D'$ passing through the flanges $b^6$ and the lower parts of the joint-plates.

3. A rail-joint having in combination a base-plate adapted to lie beneath the abutted rail ends with joint-plates C having flanges $c^4$ adapted to fit beneath the base-plate, flanges $c$ adapted to receive the bolts which pass through the vertical webs of the rails and a flange $c'$ adapted to lie upon the rail-base said flange being made thin at or near its junction with the flange $c$ and bolts D adapted to pass through the webs of the rails and through flanges $c$.

4. A rail-joint having in combination a base-plate adapted to lie beneath the abutted rail ends with joint-plates C having flanges $c^4$ adapted to fit beneath the base-plate, flanges $c$ adapted to receive the bolts which pass through the vertical webs of the rails and a flange $c'$ adapted to lie upon the rail-base the contacting face $c^2$ of said flange being rounded and the flange made thin at or near the junction of the flange $c$ and bolts D adapted to pass through the rail-webs and through the flanges $c$ of the joint-plates.

JOHN WILLS CLOUD.

Witnesses:
 JOSEPH W. TAYLOR,
 FREDK. PAPENBROOK.